(12) United States Patent
Spear (10) Patent No.: US 8,997,436 B2
(45) Date of Patent: Apr. 7, 2015

(54) WALL PANEL SYSTEM

(71) Applicant: Douglas B. Spear, Clarkston, MI (US)

(72) Inventor: Douglas B. Spear, Clarkston, MI (US)

( * ) Notice: Subject to any disclaimer, the term of this patent is extended or adjusted under 35 U.S.C. 154(b) by 0 days.

(21) Appl. No.: 13/796,265

(22) Filed: Mar. 12, 2013

(65) Prior Publication Data

US 2013/0305648 A1    Nov. 21, 2013

Related U.S. Application Data

(60) Provisional application No. 61/648,797, filed on May 18, 2012.

(51) Int. Cl.
| | | |
|---|---|---|
| E04H 1/00 | (2006.01) | |
| E02D 27/00 | (2006.01) | |
| E04C 1/00 | (2006.01) | |
| E04B 2/00 | (2006.01) | |
| E04C 2/38 | (2006.01) | |
| E04F 13/08 | (2006.01) | |
| B29C 65/00 | (2006.01) | |
| B29L 24/00 | (2006.01) | |
| B29C 65/58 | (2006.01) | |
| B29L 31/00 | (2006.01) | |

(52) U.S. Cl.
CPC .......... *E04F 13/0894* (2013.01); *B29C 66/435* (2013.01); *B29L 2024/006* (2013.01); *B29C 65/58* (2013.01); *B29C 66/12425* (2013.01); *B29C 66/126* (2013.01); *B29C 66/54* (2013.01); *B29L 2031/776* (2013.01)

(58) Field of Classification Search
USPC .............. 52/36.1, 36.5, 239, 241, 293.3, 580, 52/589.1, 588.1, 582.1, 592.1, 800.1, 52/794.1, 309.7, 309.8
See application file for complete search history.

(56) References Cited

U.S. PATENT DOCUMENTS

| | | | |
|---|---|---|---|
| 2,154,520 | A | 4/1939 | Mackin |
| 2,370,769 | A | 3/1945 | Baker et al. |
| 3,037,590 | A * | 6/1962 | Pavlecka .................... 52/481.2 |
| 3,457,698 | A | 7/1969 | Albers |
| 3,789,435 | A | 2/1974 | Heisner |
| 3,859,000 | A * | 1/1975 | Webster ......................... 404/41 |
| 3,885,362 | A | 5/1975 | Pollock |
| 4,120,124 | A | 10/1978 | Temple et al. |
| 4,129,163 | A | 12/1978 | Johnson |
| 4,194,313 | A | 3/1980 | Downing |
| 4,250,676 | A | 2/1981 | Presby |
| 4,680,902 | A | 7/1987 | Stefnik et al. |
| 4,709,517 | A | 12/1987 | Mitchell et al. |
| 4,749,601 | A | 6/1988 | Hillinger |
| 4,757,657 | A | 7/1988 | Mitchell et al. |
| 4,761,922 | A | 8/1988 | Black |
| 4,798,035 | A | 1/1989 | Mitchell et al. |
| 4,825,610 | A | 5/1989 | Gasteiger |
| 4,903,444 | A | 2/1990 | Berndt, Jr. |

(Continued)

*Primary Examiner* — Ryan Kwiecinski
(74) *Attorney, Agent, or Firm* — Gifford, Krass, Sprinkle, Anderson & Citkowski, P.C.; Douglas L. Wathen (57) ABSTRACT

A wall panel system includes a base track and a plurality of interlocking wall panels. Each wall panel includes a continuous and unitarily formed first panel member and a continuous and unitarily formed second panel member. Each panel member includes a first face portion, an edge portion, and a plurality of connection members. The first and second panel members are interconnected by the plurality of connection member on the first panel member engaging the plurality of connection members on the second panel member.

13 Claims, 7 Drawing Sheets

(56) References Cited

U.S. PATENT DOCUMENTS

| | | | |
|---|---|---|---|
| 4,949,490 A | 8/1990 | Miller | |
| 5,007,473 A | 4/1991 | Evensen | |
| 5,136,821 A | 8/1992 | Child | |
| 5,272,850 A * | 12/1993 | Mysliwiec et al. | 52/582.2 |
| 5,305,567 A * | 4/1994 | Wittler | 52/238.1 |
| 5,348,778 A * | 9/1994 | Knipp et al. | 428/35.8 |
| 5,491,943 A * | 2/1996 | Vondrejs et al. | 52/239 |
| 5,759,661 A | 6/1998 | Ang et al. | |
| 6,042,301 A | 3/2000 | Sovran | |
| 6,314,704 B1 * | 11/2001 | Bryant | 52/745.1 |
| 6,374,552 B1 | 4/2002 | Price | |
| 6,393,783 B2 * | 5/2002 | Emaus et al. | 52/239 |
| 6,430,885 B1 | 8/2002 | Ito | |
| 6,502,357 B1 | 1/2003 | Stuthman et al. | |
| 6,530,183 B1 | 3/2003 | Kuei-Yung | |
| 6,799,404 B2 * | 10/2004 | Spransy | 52/582.1 |
| 6,964,138 B2 | 11/2005 | Carroll et al. | |
| 7,395,999 B2 | 7/2008 | Walpole | |
| 7,398,624 B2 * | 7/2008 | Swiszcz et al. | 52/506.08 |
| 8,029,880 B2 * | 10/2011 | Liu | 428/60 |
| 8,136,324 B2 * | 3/2012 | Browning et al. | 52/588.1 |
| 8,522,500 B1 * | 9/2013 | Brown | 52/404.4 |
| 2003/0221392 A1 | 12/2003 | Furman | |
| 2008/0307739 A1 * | 12/2008 | Clucas | 52/580 |
| 2009/0133354 A1 * | 5/2009 | Spear et al. | 52/588.1 |
| 2011/0126487 A1 * | 6/2011 | Browning et al. | 52/586.1 |
| 2011/0173925 A1 * | 7/2011 | Brown | 52/794.1 |
| 2013/0067840 A1 * | 3/2013 | Martensson et al. | 52/309.1 |

* cited by examiner

WALL PANEL SYSTEM

CROSS-REFERENCE TO RELATED APPLICATIONS

This Application claims the benefit of U.S. Provisional Application 61/648,797 filed on May 18, 2012, the entire content of which is incorporated herein in its entirety.

FIELD OF THE INVENTION

The present invention relates generally to modular wall systems for temporary installations.

BACKGROUND OF THE INVENTION

Temporary walls or partitions are often used at construction sites, such as renovation or remodeling projects in malls, hotels, office buildings and other public or private venues. These walls provide a safety and security barrier while the renovation or remodeling project is in progress. They may also block dust and noise from entering public spaces on the other side of the wall. Typically, temporary walls or partitions are constructed on site using traditional building materials, such as lumber and drywall or plywood. This is costly, time-consuming and creates debris. Additionally, such temporary walls are difficult to reuse after no longer being needed at a particular location.

SUMMARY OF THE INVENTION

The present invention provides several embodiments of a wall panel system, as well as methods of making such systems. A first embodiment of a wall panel system includes a base track and a plurality of interlocking wall panels. Each wall panel has a top end and a bottom end extending between a pair of opposed edges. Each panel has a front face and an opposed rear face. Each panel has a tongue extending from one of the edges and a groove defined in the opposed edge such that the tongue of one panel engages the groove of an adjacent panel. Each of the plurality of interlocking wall panels includes a continuous and unitarily formed first panel member and a continuous and unitarily formed second panel member. The first panel member includes a first face portion having an outer surface defining the first face of the panel and an opposed inner surface. An edge portion is interconnected with an edge of the first face portion and defines an edge of the panel with an elongated tongue extending therefrom. A plurality of connection members extends from the inner surface of the first face portion. The second panel member includes a second face portion having an outer surface defining the second face of the panel and an opposed inner surface. An edge portion is interconnected with an edge of the second face portion and defines an edge of the panel with an elongated groove defined therein. A plurality of connection members extends from the inner surface of the second face portion. The first and second panel members are interconnected by the plurality of connection members on the first panel member engaging the plurality of connection members on the second panel member. The interconnected first and second panel members cooperate to define a panel with a closed perimeter in horizontal cross-section.

In some versions, the plurality of connection members on one of the panel members is a plurality of pillar-shaped elements, each having a base connected to the inner surface and an outer end with a connection feature defined thereon. In some alternatives, the connection members on the other of the panel members are a plurality of tube-shaped elements, each having a base connected to the inner surface and an outer end with a connecting feature defined thereon. The connecting feature on the pillar-shaped elements may be a tip with an undercut side and the connecting feature on the tube-shaped elements may be an opening in an outer end of the tube-shaped element with an inwardly extending flange for receiving the tip of one of the pillar-shaped elements.

In some versions, the plurality of connection members on one of the panel members is a plurality of elongated ribs, each having a base connected to the inner surface and an outer end with a connecting feature defined thereon. In some alternatives, the plurality of connection members on the other of the panel members each comprise a pair of spaced apart ribs having a slot defined therebetween. The slot receives the connecting feature of one of the elongated ribs. The spaced apart ribs may each have flanges thereon, with the flanges extending inwardly at the top of the slot. In some versions, the face portion of each of the panel members has a first edge and a second edge. The edge portion of each panel member is interconnected the first edge. The edge portion of each panel member further has a receiver for receiving the second edge of the face portion of the other panel member. This receiver may be a ledge defined on an inner surface of the edge portion and the second edge of the face portion of the other panel may rest against the ledge when the panel members are interconnected.

In accordance with a second embodiment of the present invention, a method is provided for forming interlocking wall panels. Each of these panels has a top end and a bottom end extending between a pair of opposed edges. Each panel has a front face and an opposed rear face. Each panel has a tongue extending from one of the edges and a groove defined in the opposed edge, such that the tongue of one panel can engage the groove of an adjacent panel. A first panel member is extruded. The first panel member includes a first face portion having an outer surface defining the first face of the panel and an opposed inner face. An edge portion is interconnected with an edge of the first face portion and defines an edge of the panel with an elongated tongue extending therefrom. A plurality of connection members extends from the inner surface of the first face portion. A second panel member is also extruded. The second panel member includes a second face portion having an outer surface defining the second face of the panel and an opposed inner surface. An edge portion is interconnected with an edge of the second face portion and defines an edge of the panel with an elongated groove defined therein. A plurality of connection members extends from the inner surface of the second face portion. The first and second panel members are interconnected by engaging the plurality of connection members on the first panel member with the plurality of connection members on the second panel member. The interconnected first and second panel members cooperate to define a panel with a closed perimeter in horizontal cross-section.

According to a third embodiment of the present invention, a wall panel system includes a base track and a plurality of interlocking wall panels. Each wall panel has a top end and a bottom end extending between a pair of opposed edges. Each panel has a tongue extending from one of the edges and a groove defined in the opposed edge, such that the tongue of one panel engages the groove of an adjacent panel. Each of the plurality of interlocking wall panels includes a first and second elongated vertical extrusion. Each extrusion has a front face and a back face extending between a left side and a right side. The front and back faces are generally flat and parallel to each other, and are spaced apart by an extrusion thickness. One of the sides has a groove defined therein and the other of the sides has a tongue extending therefrom. A planar panel body has a front face and a back face that are each generally flat and parallel to each other. The front and back faces are spaced apart by a panel body thickness substantially the same as the extrusion thickness. The planar panel body is disposed between the first and second elongated vertical extrusions, such that one of the extrusions defines one of the edges of the panel, and the other of the extrusions defines the other of the edges of the panel. A front skin continuously covers the front faces of the panel body and the first and second extrusion, so as to provide a smooth, continuous and planar front surface for substantially the entirety of the panel. A back skin continuously covers the back faces of the panel body and the first and second extrusions, so as to provide a smooth, continuous and planar rear surface for substantially the entirety of the panel.

In some versions, the first and second extrusions are substantially identical.

DETAILED DESCRIPTION OF THE PREFERRED EMBODIMENTS

Figure 1:
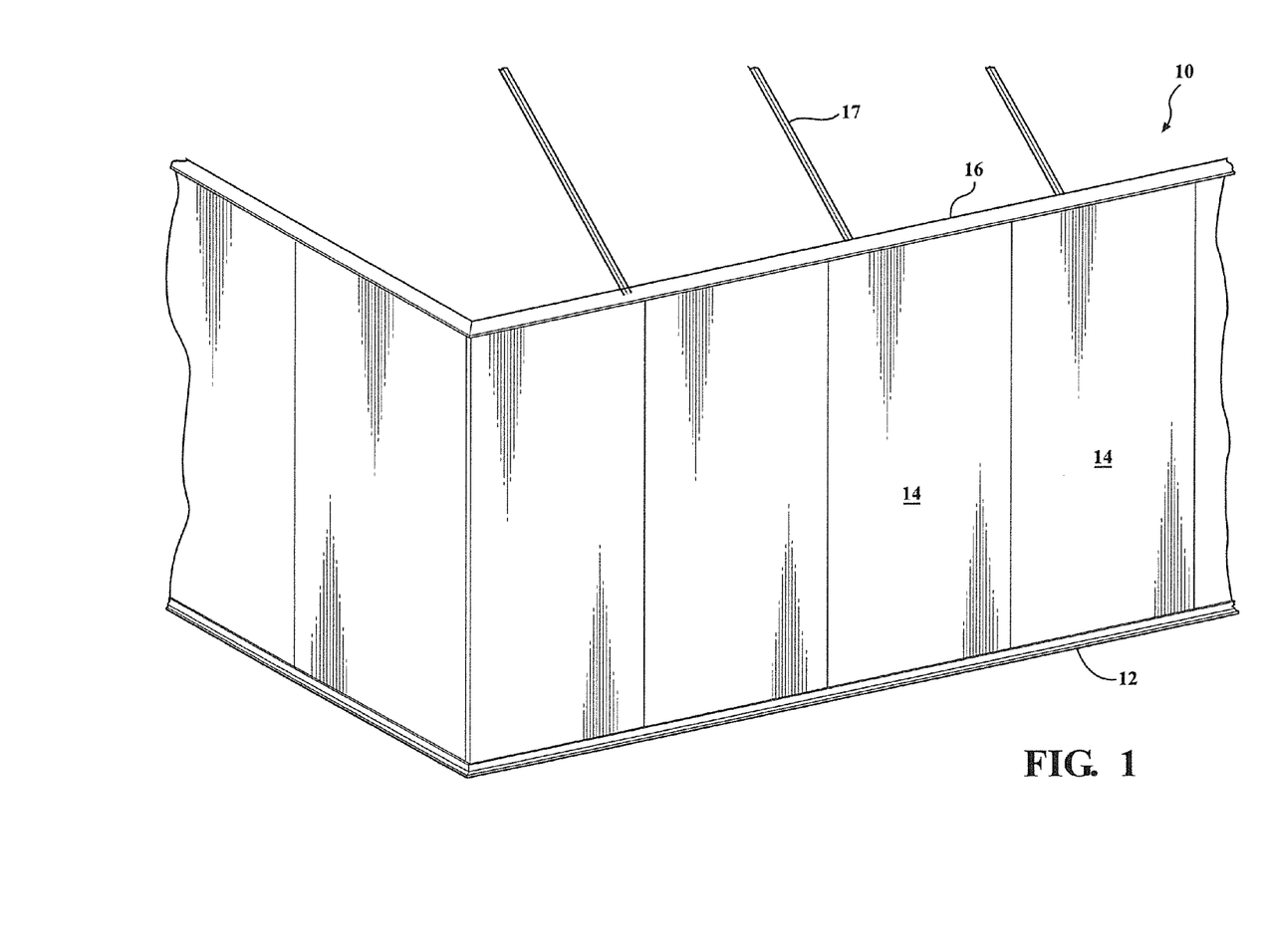
FIG. 1 is a perspective view of a wall panel system in accordance with an embodiment of the present invention.

The present invention provides several embodiments of a wall panel system including interlocking wall panels, as well as methods for making such interlocking wall panels. Referring to FIG. 1, a wall panel system is shown generally at 10. It includes a base track 12 and a plurality of interlocking wall panels 14 that are received on the base track and interlock with one another so as to form a generally continuous wall. A top track 16 may be received on the upper end of the wall panels 14 and braces 17 may be used for stabilizing the wall panel system or interconnecting it with other structures. The wall panel system may be used as a temporary wall system around construction or remodeling sites, or as wall panels to form a temporary enclosure, such as at a tradeshow.

Figure 2:
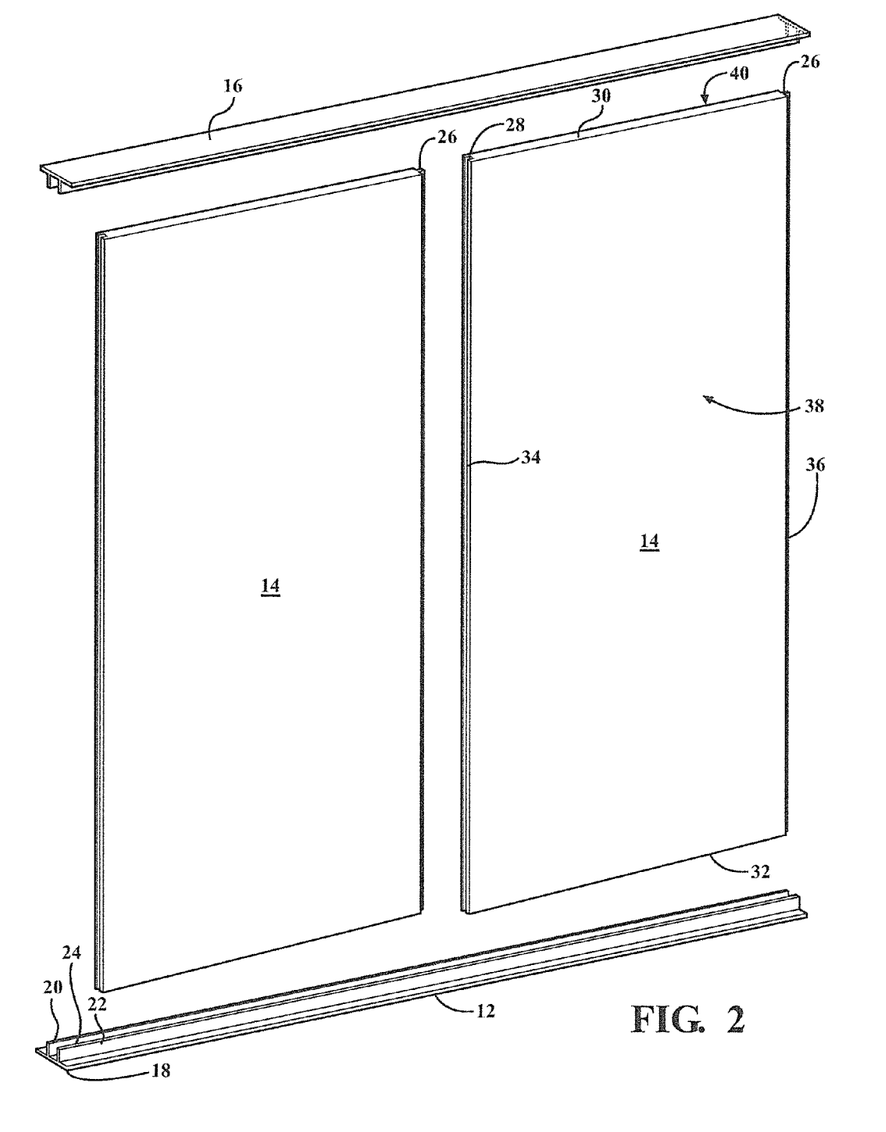
FIG. 2 is a perspective view of a pair of interlocking wall panels and a base track and a top track separated so as to show the manner in which they are assembled.

FIG. 2 shows a portion of a base track 12, two wall panels 14, and a portion of a top track 16. As shown, the base track is an extruded, elongated track having a generally flat bottom piece 18 and two upwardly extending flanges 20 and 22. The flanges 20 and 22 are spaced apart so as to define a receiving channel 24 that receives a bottom edge of the panels 14. In order to assemble a wall panel system, the base track 12 is first placed on a surface such as a floor, and then a first wall panel 14 is placed into the channel 24. A second wall panel 14 is then placed in the channel adjacent the first panel and the panels are slid together, such that a tongue 26 of one panel engages the groove 28 of the adjacent panel. In some versions, the top track 16 is an identical component to the bottom track 12 and is received on the upper edges of the panels 14.

Each wall panel may be said to have a top end 30 and a bottom end 32 that each extend between a pair of opposed edges 34 and 36. In the typical configuration, the top end 30 forms the top of the panel, the bottom end 32 forms the bottom of the panel, and the edges 34 and 36 form vertically extending side edges. However, positions such as top, bottom, and side are relative and are used for description purposes only. They are not limiting on the invention. As shown, the groove 28 is formed in one of the edges 34 and the tongue 26 extends from the other edge 36. The panels 14 may also be said to have a front face 38 and an opposed rear face 40.

Figure 3:
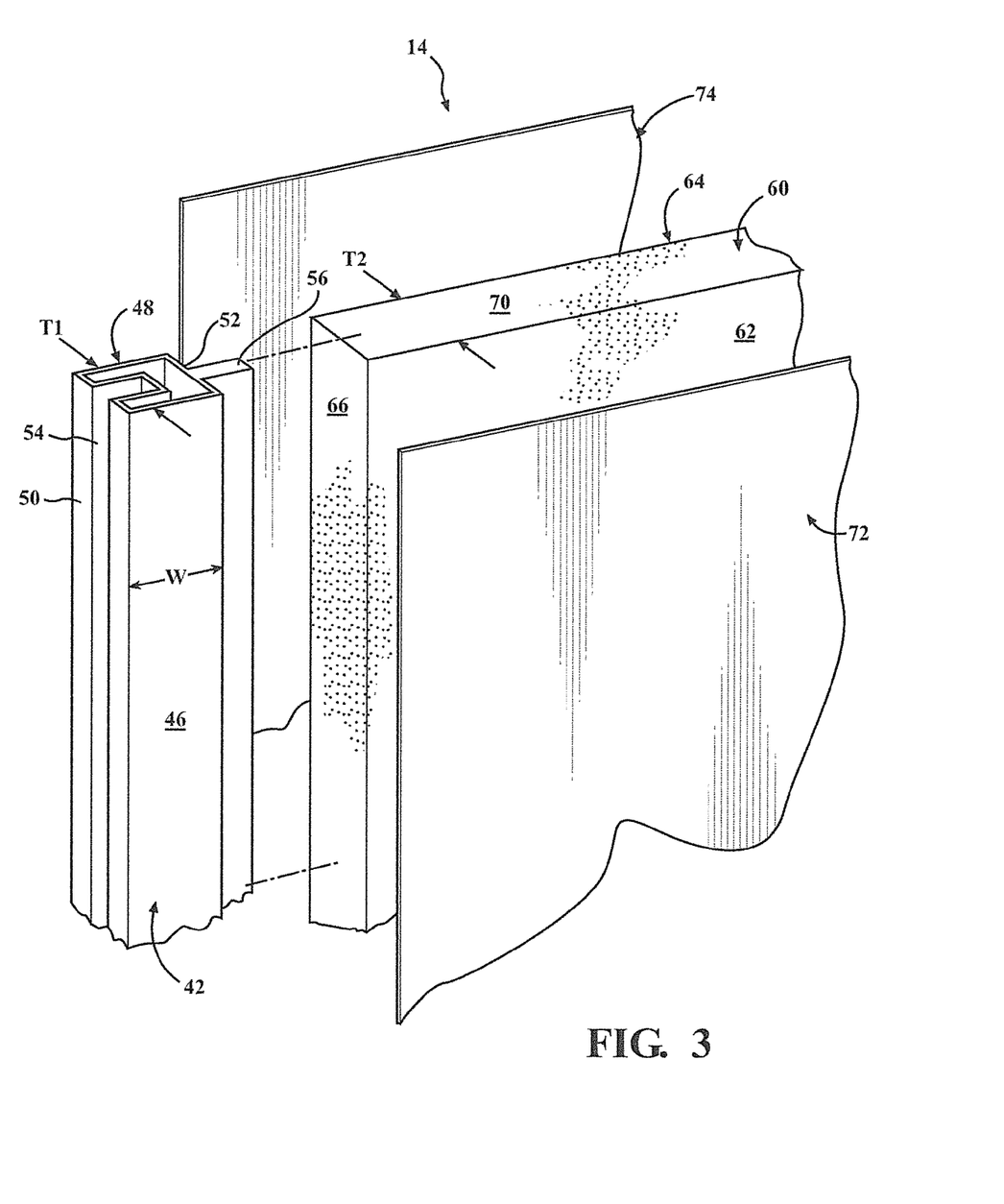
FIG. 3 is a an exploded perspective view of a portion of an interlocking wall panel.
Figure 4:
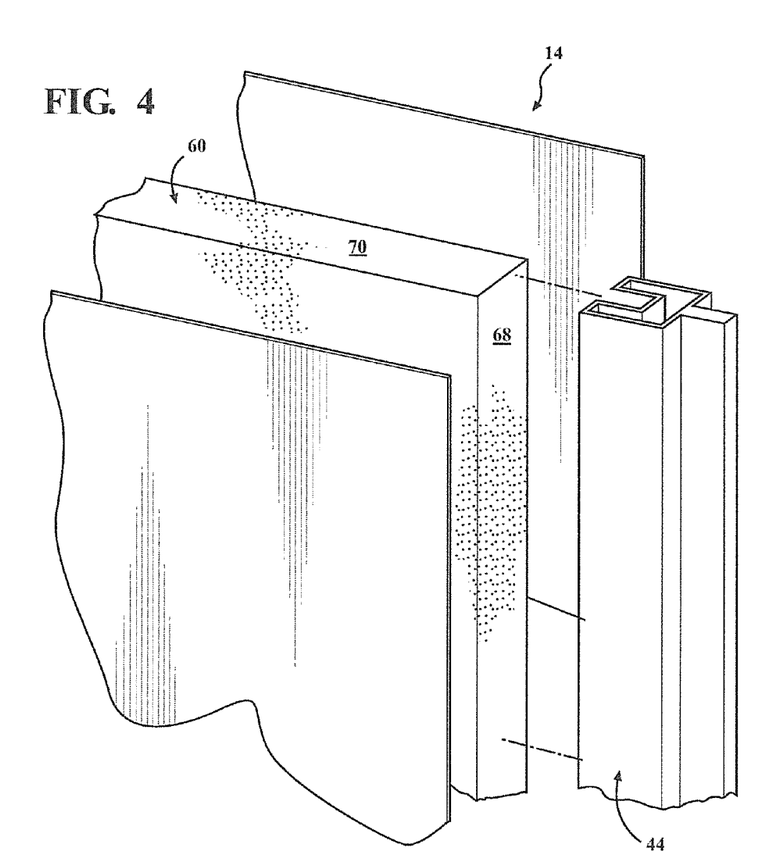
FIG. 4 is an exploded perspective view of another portion of an interlocking wall panel.
Figure 5:
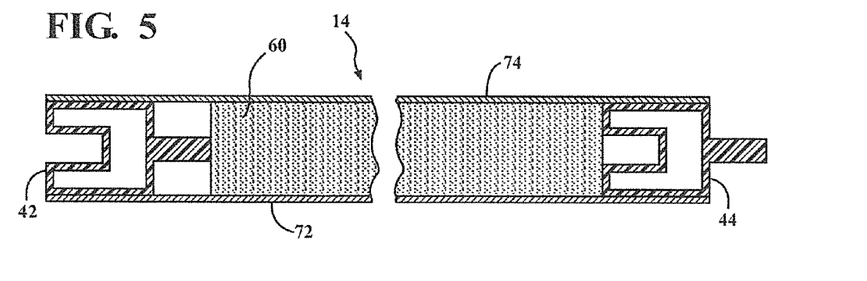
FIG. 5 is a top view of an assembled wall panel.

Referring to FIGS. 3-5, one embodiment of an interlocking wall panel in accordance with the present invention will be described in more detail. FIG. 3 shows a portion of one of the panels 14 corresponding to the upper left edge with respect to FIG. 2, and FIG. 4 shows a portion corresponding to the upper right corner with respect to FIG. 2. FIG. 5 shows a top view. Each panel 14 includes a first elongated vertical extrusion 42 and a second elongated vertical extrusion 44. Each of these extrusions defines an edge of the panel and has a length corresponding to the height of the panel. In preferred embodiments, the extrusions 42 and 44 are identical to each other. Referring to extrusion 42, the extrusion has a front face 46 and an opposed back face 48. Each of these faces is generally flat and parallel to one another. The faces are spaced apart by an extrusion thickness T1. The extrusion 42 has a left side 50 and a right side 52. In the illustrated embodiment, a groove 54 is defined in the left side 50 and the tongue 56 extends from the right side 52, though this may be reversed. In some versions, the tongue 56 is solid while the remainder of the extrusion 42 is hollow. The main body of the extrusion 42 may be said to have a width W. In one version, the width W is approximately one inch and the thickness T1 is approximately one inch. In an alternative version, the width W is approximately 2 inches.

The panel 14 further has a planar panel body 60 having a front face 62 and an opposed back face 64 that are generally flat and parallel of each other. The front face 62 and back face 64 are spaced apart by a panel body thickness T2. Preferably the thickness T1 and the thickness T2 are the same. The planar panel body 60 may also be said to have a left edge 66 and a right edge 68. A top edge 70 extends between the edges 66 and 68 and, when the panel is assembled, may define the top end of the panel 14. Likewise, a bottom edge, not shown, of the planar panel body 60 may define the bottom end of the assembled panel. A front skin 72 and a back skin 74 cover the front and back faces, respectively, of the extrusions 42 and 44 and the planar body 60. When assembled, as shown in FIG. 5, the front skin 72 continuously covers the front faces of the panel body and the first and second extrusions, so as to provide a smooth, continuous and planar front surface for substantially the entirety of the panel. Likewise, the back skin 74 continuously covers the back faces of the panel body and the first and second extrusions so as to provide a smooth, continuous and planar rear surface for substantially the entirety of the panel.

In some versions, the planar panel body is formed of polypropylene, preferably in the form of a honeycomb, while the extrusions 42 and 44 are aluminum extrusions, and the front skin 72 and rear skin 74 are sheets of plastic, such as polystyrene or ABS. In some versions, the front skin 72 and back skin 74 have a thickness of approximately 0.060 inches.

This forms a panel that is both reusable and made of recyclable components. The front skin 72 and back skin 74 both provide a smooth surface that may be printed upon or may have advertising adhered thereto, and also is easily cleaned. As known to those of skill in the art, each of the components of the wall panel may be formed by extrusion. The planar panel body 60 and the skins 72 and 74 may be formed by other processes as well. In some embodiments, the components are attached to one another using adhesive on the inner surfaces of the skins. As shown, the planar panel body may have smooth edges 66 and 68, such that the tongue 56 of the extrusion 42 sits against the edge 66, but does not extend into the panel body 60. Alternatively, a groove may be formed in the planar panel body to receive the tongue 56.

In some versions, the assembled panel 14 has an unfinished top and bottom end. That is, the panel body 60 and extrusions 42 and 44 are exposed at the top and bottom ends of the panel; there is no cap or covering piece. As such, these versions consist of only five components: two extrusions, two skins, and a panel body. If adhesive is counted, only 6 components are required. The two extrusions may be identical and the two skins may be identical such that a panel may be constructed using only three part types, plus adhesive.

Referring now to FIGS. 6-9, an alternative embodiment of an interlocking wall panel will be described. The wall panel 80 is formed by interconnecting a first panel member 82 and a second panel member 84. Each panel member 82 and 84 is extruded as a continuous and unitarily formed piece. As such, an entire wall panel can be formed by interconnecting two extruded pieces. In some versions, no adhesive is required. Therefore, each panel consists of only two elements, each of which may be formed from the same material.

Figure 6:
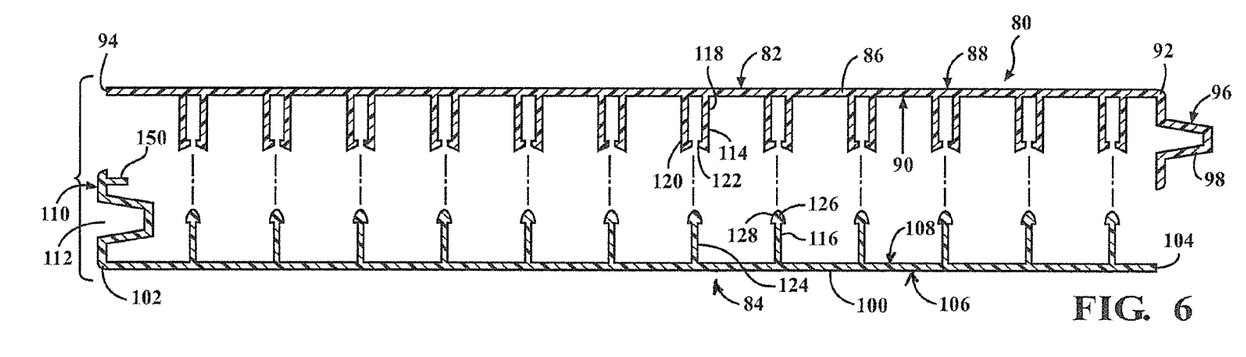
FIG. 6 is an exploded top view of another embodiment of an interlocking wall panel.

The first panel member 82 has a first face portion 86 with an outer surface 88 defining a first face of the finished panel. The first face portion also has an opposed inner surface 90. A shown, this first face portion is a large, generally planar, member. It extends substantially the entire height and width of a finished panel. The first face portion may be said to have a first edge 92 and an opposed second edge 94. An edge portion 96 is interconnected with and integrally formed with the first edge 92 of the first face portion 82. This edge portion 96 defines an edge of the assembled panel and, in this version, has an elongated tongue 98 extending therefrom.

The second panel member 84 has a second face portion 100 with substantially identical dimensions to the first face portion 86. The second face portion has a first edge 102 and an opposed second edge 104. It also has an outer surface 106 that defines the second face of an assembled panel. The second face portion 84 also has an opposed inner surface 108. An edge portion 110 is interconnected with and integrally formed with the first edge 102 of the second face portion 84 and defines an edge of the finished panel. The edge portion 110 in this version includes an elongated groove 112 defined therein. As with the earlier embodiments, the tongue 98 and groove 112 are configured so as to interconnect. The may have different shapes and dimensions than illustrated.

Figure 9:
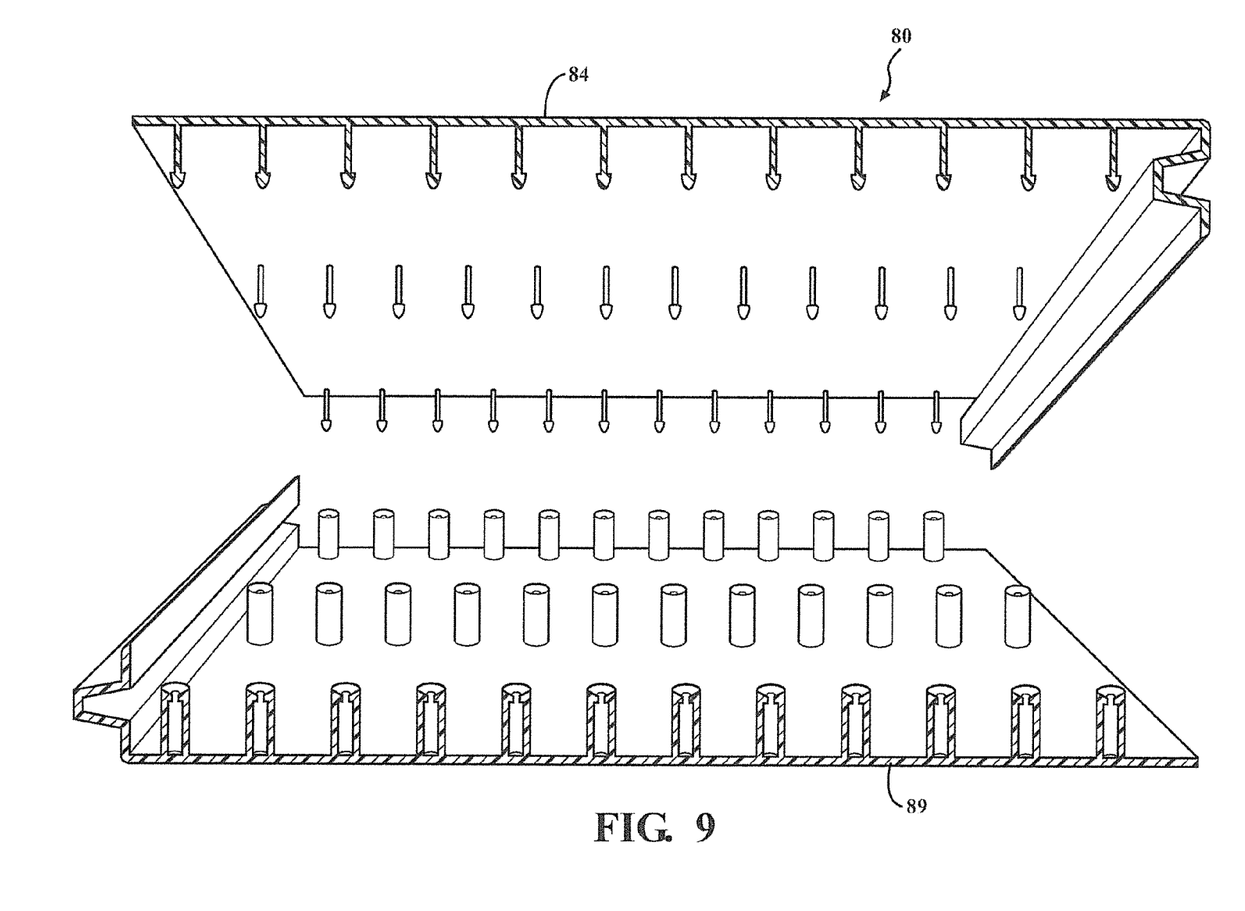
FIG. 9 is a view of components of a wall panel system separated so as to show their details.

The first panel member 82 and second panel member 84 are preferably interconnected by a plurality of connection members provided on each panel member. In the illustrated embodiment, a plurality of connection members 114 extends from the inner surface 90 of the first panel member and a plurality of connection members 116 extend from the inner surface 108 of the second panel member 84. The connection members 114 and 116 are configured so as to interconnect with one another, thereby locking the first panel member 82 to the second panel member 84 and forming a finished panel. The connection members may take any form. In FIG. 9, the connection members may take the form of individual connection members located across both the width and height of the panel members. The connection members 114 may take the form of tube-shaped elements, each having a base 118 connected to the inner surface 90 of the first panel member 82 and an outer end 120 with the connecting feature defined thereon. The connecting feature takes the form of an inwardly extending flange 122 in the open end of the outer end 120 of the tube-shaped element. The connection member 116 may take the form of a pillar-shaped element having a base 124 connected to the inner surface 108 of the second panel member 84 and an outer end 126 with a connecting feature defined thereon. The connecting feature takes the foil 7 of a tip 128 with an undercut side. This tip 128 is configured to engage the opening in the end of the connection member 114. In order to form the panel members as shown in FIG. 9, a special extrusion method is used that allows the creation of the connection members at periodic intervals along the extrusion direction as the panel members are extruded.

Figure 10:
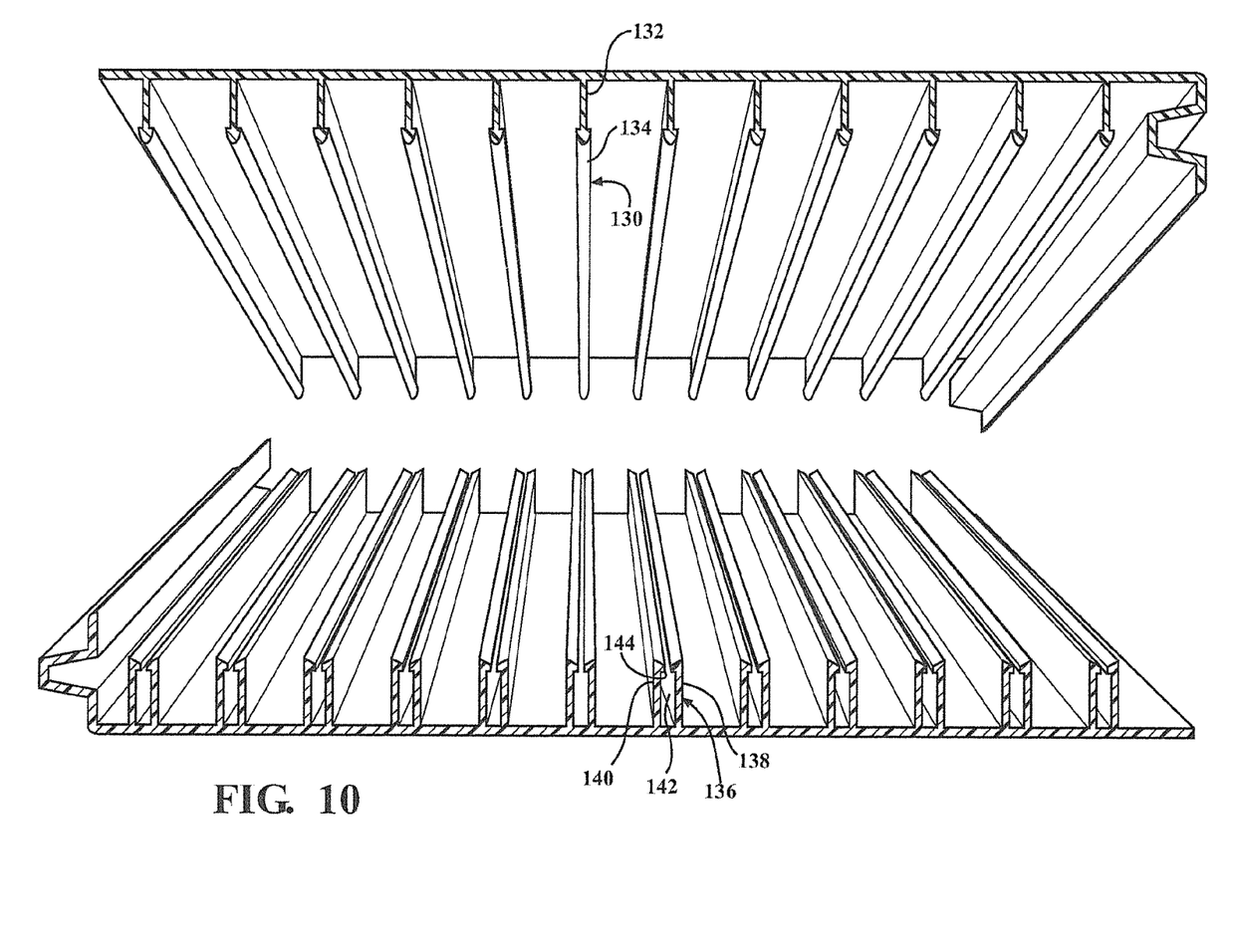
FIG. 10 is an exploded view of portions of an alternative version of a wall panel.

FIG. 10 illustrates an alternative version in which the connection members take the form of elongated ribs that extend along the extrusion direction of the panel. This approach utilizes more traditional extrusion methods. The connection members 130 on one of the panel members takes the form of an elongated rib having a base 132 connected to the inner surface and an outer end 134 with a connecting feature defined thereon. In the illustrated embodiment, the connecting feature takes the form of a tip with an undercut side. The corresponding connection members 136 on the other panel member each take the form of a pair of spaced-apart ribs 138 and 140 with a slot 142 defined therebetween. The slot is configured to receive one of the ribs 130. The slot may have a connecting feature at its outer end. In the illustrated embodiment, the connecting feature takes the form on inwardly extending flanges 144 at the top of the slot 142.

Some embodiments of the present invention may further include a feature for supporting the second edge 94 or 104 of a panel member. Referring to FIG. 6, a ledge 150 is shown extending from an inward surface of the edge portion 110 positioned so as to receive and support the second edge 94 of the panel member 82. This may help to align the edges of the panel members for a uniform appearance. This ledge 150 may be considered a receiver for receiving the second edge 94. It may also be provided for the other second edge 104.

Figures 7, 8:
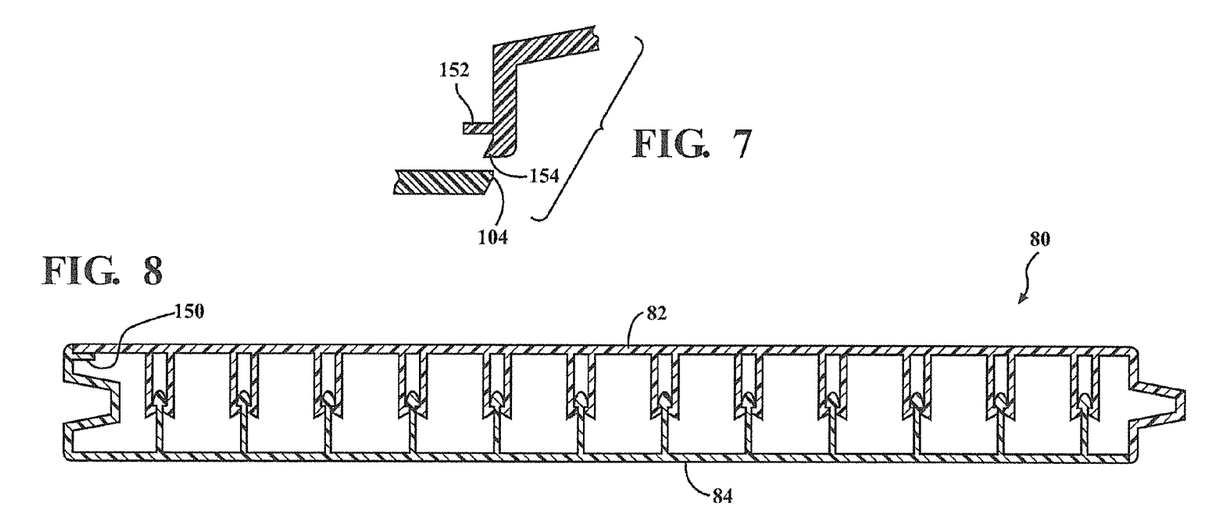
FIG. 7 is a detailed view of an optional feature of an interlocking wall panel.
FIG. 8 is a top view of the wall panel components of FIG. 6 after assembly.

Referring to FIG. 7, an alternative approach is illustrated. Here, a ledge 152 is provided along with a catch 154. The edge 104 is shaped so as to be received on top of the ledge 152 and behind the catch 154. Other approaches are also possible. Adhesive or other connection features may also be used.

As best shown in FIG. 8, the assembled panel 80 may be said to have a completely closed perimeter in a horizontal cross-section. FIG. 8 may be said to represent a horizontal cross-section of the dissembled panel and the entire perimeter of this cross-section is closed, as in having no gaps. In some versions, the top and bottom ends of the assembled panel are open to the hollow interior, as shown in FIG. 8. No cap or finishing piece is used. Instead, the top and bottom tracks cover these openings.

As will be clear to those of skill in the art, the herein described embodiments of the present invention may be altered in various ways without departing from the scope or teaching of the present invention. It is the following claims, including all equivalents, that define the scope of the present invention.

The invention claimed is:

1. A wall panel system comprising:
   a base track; and a plurality of interlocking wall panels each having a top end and a bottom end extending between a pair of opposed edges, each of the plurality of panels having a panel tongue extending from one of the pair of opposed edges and a panel groove defined in the opposed one of the pair of opposed edges such that the panel tongue of one panel engages the panel groove of an adjacent panel;

each of the plurality of interlocking wall panels comprising:

a first and second elongated vertical extrusion each having a front face and a back face extending between a left side and a right side, the front and back faces each being generally flat and parallel to each other, the front and back faces being spaced apart by an extrusion thickness, one of the sides of each of the extrusions having an extrusion groove defined therein and the other of the sides of each of the extrusions having an extrusion tongue extending therefrom, wherein the extrusion tongue is a solid extrusion tongue, the first and second extrusions being metal extrusions having a hollow body portion, the first and second extrusions being identical to each other;

a planar panel body having a front face and a back face that are each generally flat and parallel to each other, the front and back faces being spaced apart by a panel body thickness substantially the same as the extrusion thickness;

the planar panel body being disposed between the first and second elongated vertical extrusions such that one of the extrusions defines one of the edges of the panel and the other of the extrusions defines the other of the edges of the panel, the extrusion groove of one of the extrusions defining the panel groove and the extrusions tongue of the other of the extrusions defining the panel tongue;

a front skin continuously covering the front faces of the panel body and the entirety of the front faces of the first and second extrusions so as to provide a smooth, continuous and planar front surface for the panel; and a back skin continuously covering the back faces of the panel body and the entirety of the front faces of the first and second extrusions so as to provide a smooth, continuous and planar rear surface for the panel.

2. A wall panel system in accordance with claim 1, wherein:
each of the plurality of interlocking wall panels consists of only five components.

3. A wall panel system in accordance with claim 2, wherein:
each of the plurality of interlocking wall panels consists of only three types of components.

4. A wall panel system in accordance with claim 1, wherein:
each of the extrusions is an aluminum extrusion.

5. A wall panel system in accordance with claim 1, wherein the base track has a flat bottom portion and a pair of upwardly extending flanges, the flanges spaced apart so as to define a receiving channel for receiving the bottom end of the plurality of wall panels.

6. A wall panel system comprising:
a base track; and
a plurality of interlocking wall panels each having a top end and a bottom end extending between a pair of opposed edges, each of the plurality of panels having a panel tongue extending from one of the pair of opposed edges and a panel groove defined in the opposed one of the pair of opposed edges such that the panel tongue of one panel engages the panel groove of an adjacent panel;

each of the plurality of interlocking wall panels comprising:

a first and second elongated vertical extrusion each having a front face and a back face extending between a groove side and a tongue side, the front and back faces each being generally flat and parallel to each other, the front and back faces being spaced apart by an extrusion thickness, the groove side of each of the extrusions having an extrusion groove defined therein and the tongue side of each of the extrusions having an extrusion tongue extending therefrom;

a planar panel body having a front face and a back face that are each generally flat and parallel to each other, the front and back faces extending between a first and second edge of the planar panel body, the front and back faces being spaced apart by a panel body thickness substantially the same as the extrusion thickness;

the planar panel body being disposed between the first and second elongated vertical extrusions such that the first extrusion defines the panel groove of the panel and the second extrusion defines the panel tongue of the panel, an outer end of the tongue of the first extrusion abutting a corresponding one of the first and second edges of the panel body and not extending into the panel body such that the tongue side of the first extrusion is spaced from the corresponding one of the first and second edges of the panel body by a length of the tongue;

a front skin continuously covering the entirety of the front faces of the panel body and the first and second extrusions so as to provide a smooth, continuous and planar front surface for the panel; and a back skin continuously covering the entirety of the back faces of the panel body and the first and second extrusions so as to provide a smooth, continuous and planar rear surface for the panel.

7. A wall panel system in accordance with claim 6, wherein:
the first and second extrusions are identical.

8. A wall panel system in accordance with claim 6, wherein:
each of the plurality of interlocking wall panels consists of only five components.

9. A wall panel system in accordance with claim 8, wherein:
each of the plurality of interlocking wall panels consists of only three types of components.

10. A wall panel system in accordance with claim 6, wherein:
each of the extrusions is hollow.

11. A wall panel system in accordance with claim 10, wherein:
the tongue of each extrusion is solid and a remainder of each extrusion is hollow.

12. A wall panel system in accordance with claim 6, wherein:
each of the extrusions is an aluminum extrusion.

13. A wall panel system in accordance with claim 6, wherein the base track has a flat bottom portion and a pair of upwardly extending flanges, the flanges spaced apart so as to define a receiving channel for receiving the bottom end of the plurality of wall panels.

* * * * *